March 10, 1936.　　　G. A. KLIMEK　　　2,033,475
TORQUE CONVERTER
Filed May 11, 1935　　　4 Sheets-Sheet 1

INVENTOR.
Gustav A. Klimek
BY Haguet, Neary & Campbell
ATTORNEYS

March 10, 1936.   G. A. KLIMEK   2,033,475
TORQUE CONVERTER
Filed May 11, 1935    4 Sheets-Sheet 2

INVENTOR.
Gustav A. Klimek
BY Hoguet, Henry & Campbell
ATTORNEYS

March 10, 1936. G. A. KLIMEK 2,033,475
TORQUE CONVERTER
Filed May 11, 1935 4 Sheets-Sheet 3

INVENTOR.
Gustav A. Klimek
BY Hoguet, Neary & Campbell
ATTORNEYS

March 10, 1936. G. A. KLIMEK 2,033,475
TORQUE CONVERTER
Filed May 11, 1935  4 Sheets-Sheet 4
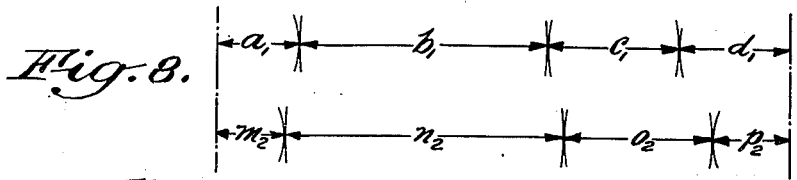
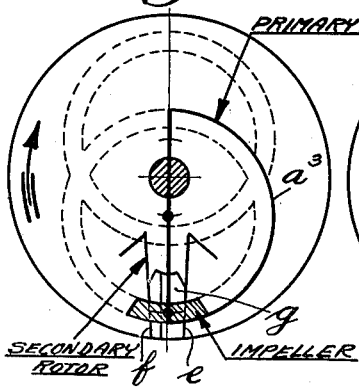
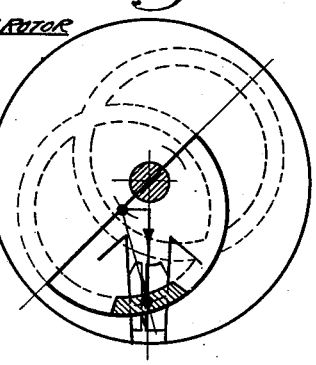
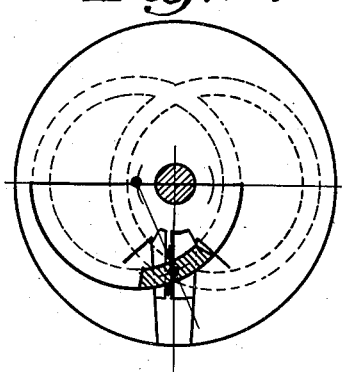
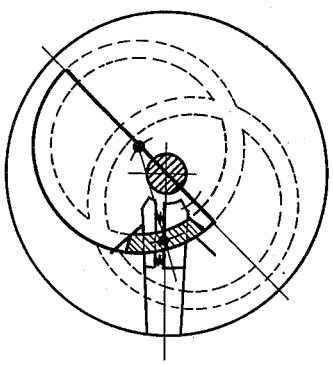
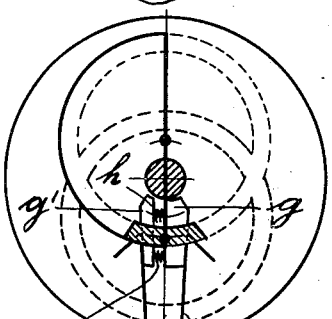
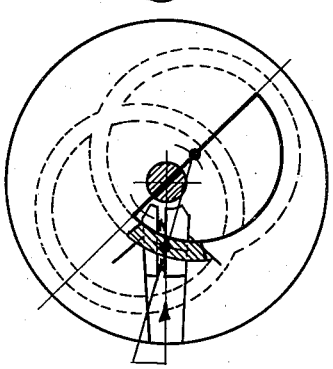
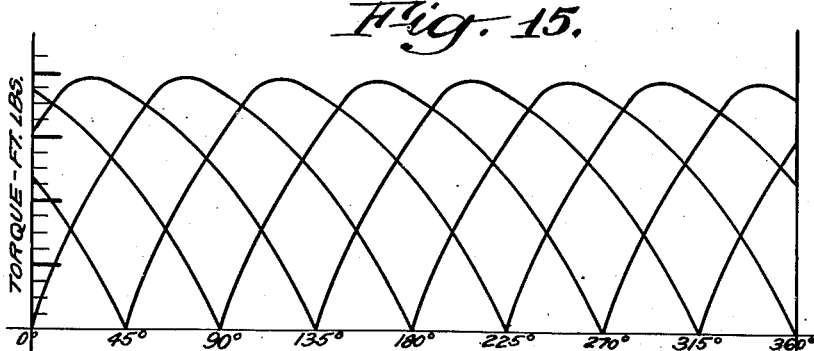
INVENTOR.
Gustav A. Klimek
BY
Hoguet, Neary & Campbell
ATTORNEYS Patented Mar. 10, 1936

2,033,475

UNITED STATES PATENT OFFICE 2,033,475

TORQUE CONVERTER

Gustav A. Klimek, East Rutherford, N. J., assignor to Diehl Corporation, New York, N. Y., a corporation of New York Application May 11, 1935, Serial No. 20,935

6 Claims. (Cl. 74—64)

In a co-pending application filed by the present applicant on July 25, 1934, Serial No. 736,876 there is disclosed and claimed an improved torque converter characterized by the inclusion of reactance means to reduce forces impressed on the movable impellers which are operatively engaged with the rotors and oppose the rotation of the driven rotor in a predetermined direction. As disclosed in said co-pending application driving and driven rotors are operatively interconnected by the provision of circular tracks on one of the members disposed eccentrically with respect to one another and with respect to the axis of rotation, and movable impellers are operatively interposed between said tracks and the other of said members. The relationship of parts is such that rotation of the driving rotor causes a planetary movement of the impellers about the axis of rotation and impresses driving forces on the driven rotor. By the inclusion of reactance means negative forces tending to oppose rotation of the driving rotor are reduced to a predetermined extent.

The principal object of the present invention is to improve the construction of torque converters embodying the principles disclosed and claimed in said co-pending application by making the construction and assembly simpler and more compact, and the operation itself more efficient and effective to assure a smooth and uniform transmission of power from the primary rotor to the driven shaft. More particularly, the principal object of the invention is to diffuse the torque impulses so that there is a more constant application of driving force to the driven rotor in the order of one impulse at every 45° of rotation instead of 120° as in the previous case. The result of such construction in accordance with the invention is not only smoother and more uniform transmission of power but also the elimination of surging and chattering of the impellers. Torsional vibrations are also eliminated with a reduction in the wear and stress on the moving parts. The improved action may be likened to that obtained by an increase in the number of cylinders in an internal combustion engine but in accordance with the present improvements the number of impulses is not proportional to the increase in the number of impeller blocks because while the number of impeller blocks has been increased by only two the number of impulses has been increased in the order of from three to eight.

A further object of the invention is to provide improved reactance means which are effective for the purpose heretofore indicated but which are mechanical in character as distinguished from hydraulic.

Still another object of the invention is to change the radial relationship of the pairs of blocks to the axis of rotation so as not only to increase the number of impulses as indicated but also assure under all conditions both static and dynamic balance. Whereas in the aforementioned application the blocks of a pair are shown as operatively engaged with separate tracks in accordance with the present invention the blocks of a pair are engaged operatively with the same track. Being displaced by 180° it will be apparent that in the improved construction the blocks of a pair always move in the same direction along the diameter of the circular track with which such blocks are engaged whereas in the previous case the blocks of a pair moved in opposite directions.

These and other objects of the invention will appear more particularly in connection with the detailed description of the embodiment illustrated in the accompanying drawings, wherein:

Figure 8 shows vectorially the dynamic balance indicated by Figure 7.

Figures 9–14 show diagrammatically the relation of the primary rotor to the secondary rotor and to one of the impeller blocks during 225° of rotation of the primary rotor and assuming the secondary rotor to remain stationary meanwhile.

Figure 15 shows curves indicating the torque impulses of the several impellers during one revolution of the primary rotor.

As pointed out in the said copending application the principle underlying the invention may be embodied in various structural forms one such being illustrated in the said copending application and another such constituting the present improvements. For instance, whereas in the said copending application the reactance is impressed on a hydraulic medium such as oil in accordance with the present improvements such reactance is provided by mechanical devices. Pursuant to the present improvements certain advantages in physical structure and in the efficiency and smoothness of operation are accomplished.

Figure 2:
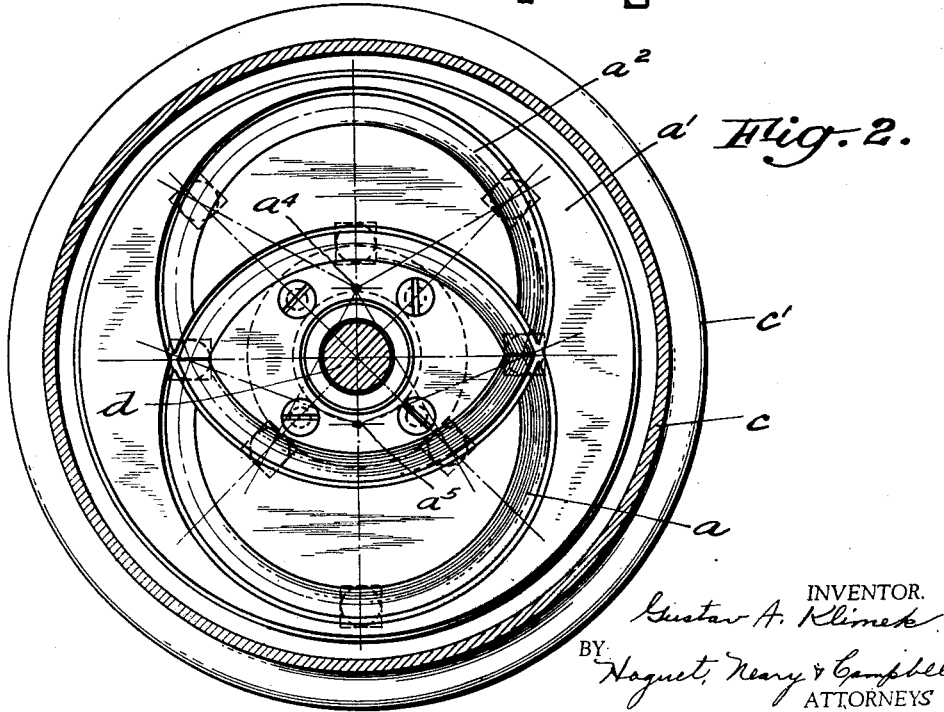
Figure 2 is a view in transverse section through the converter housing and taken on the plane indicated by the line 2—2 of Figure 1 and looking in the direction of the arrows.

Referring now to the drawings the drive shaft $a$ carries a circular plate $a'$ which constitutes one end wall of a casing, the other end wall being shown at $b$. A circular wall $c$ is secured to the end walls thereby forming a complete casing in which the improved operating parts are disposed. The circular wall $c$ may be provided with radially extending fins $c'$ for cooling. The driven shaft $d$ which is in alignment with the drive shaft extends into the casing and has thereon bearings E and F on which the end walls $a'$ and $b$, respectively, are supported for free relative rotation. The end walls $a'$ and $b$ have two similar opposed tracks indicated, respectively, at $a^2$, $b'$ and $a^3$, $b^2$. These tracks in the two end walls are laid out, respectively, on the same centers, the track $a^2$ having its center indicated at $a^4$ and the track $a^3$ having its center indicated at $a^5$. These centers are eccentric to each other and eccentric to the axis of rotation of the shafts $a$, $d$, and are disposed at equidistant points from such axis of rotation and at diametrically opposite sides thereof. This relationship results in the intersection of the respective pairs of tracks as illustrated in Figure 2 without interruption of their continuity.

Figure 3:
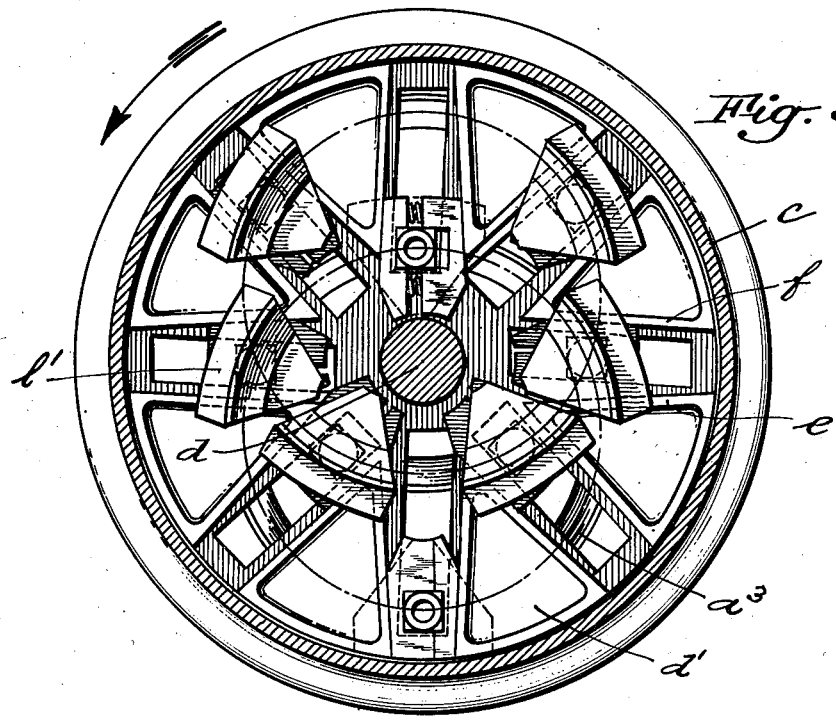
Figure 3 is a view in transverse section through the interior of the housing shown in Figure 1 and taken on the plane indicated by the line 3—3 of Figure 1 and looking in the direction of the arrows.
Figure 5:
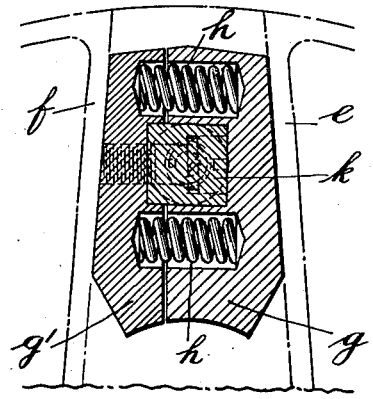
Figure 5 is a view in section and on a larger scale showing one of the slidable reactance blocks and the relation thereto of the radially extending guides therefor on the secondary rotor.

Referring now to Figure 3 the driven shaft carries an impeller structure comprising radially extending guides, one contiguous pair of which is indicated at $e$, $f$, but other pairs of which are disposed around the shaft $d$ to form eight guideways. The proximate pairs such as $e$, $f$, are relatively inclined to each other so that each guideway is more restricted at its outer end than at its inner end. The web by which such guides are supported on the shaft $d$ is indicated at $d'$, the form being such that a unitary impeller is constituted with the radially extending open guideways disposed in the relationship described. As shown on a somewhat larger scale in Figure 5 between each pair of guides $e$, $f$, for instance, is mounted a guide block which is comprised of two sections $g$, $g'$, the bearing faces of such sections being inclined to conform to the inclination of the respective guides. Springs $h$ are interposed operatively between the sections $g$, $g'$, so as to urge them outwardly into intimate contact with the respective guides $e$, $f$. This intimate engagement results in frictional contact to a predetermined degree and the tension of the springs $h$ will be greater when the guide blocks are at the outer end of the guideways than at the inner end because of the tapers, for reasons which will appear hereinafter.

Figure 1:
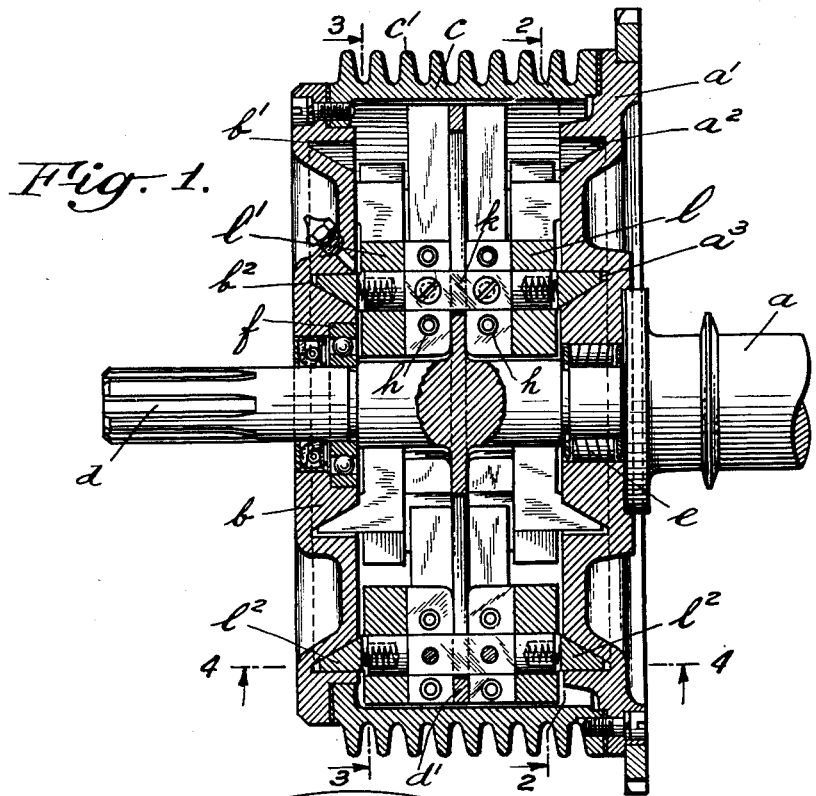
Figure 1 is a view in longitudinal section through the improved converter and showing the relation of the driving and driven shafts and the primary and secondary rotors carried therewith, respectively.
Figure 4:
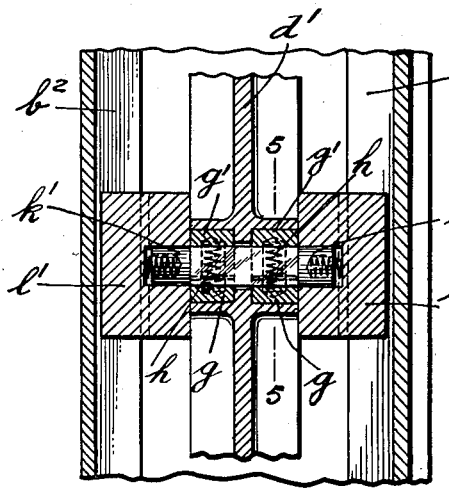
Figure 4 is a fragmentary view in section taken on the plane indicated by the line 4—4 of Figure 1 and looking in the direction of the arrows and showing particularly the relation between the track blocks and the radial guides on the secondary rotor.

Two such guide blocks are disposed between each pair of radial guides as illustrated in Figure 4, the radial guides being formed with separated bearing surfaces which are aligned. Through each such pair of guide blocks extends a trunnion member $k$ which is non-circular in cross section (illustrated as square) to prevent rotative movement within the guide blocks. The trunnion member extends beyond the end faces of the aligned guide blocks and is formed with circular trunnions $k'$, $k^1$. On the circular trunnions $k'$ are mounted pivotally track blocks $l$, $l'$, which engage respectively the circular tracks $a^3$, $b^2$. For this engagement each such track block is provided with a laterally extending flange $l^2$ which conforms in cross section to the cross section of the track. In practice, this cross section is as illustrated in Figure 1 wherein the track has one wall parallel to the axis of rotation of the driving and driven shafts and the other wall tapered with respect thereto.

In accordance with the improvements there are provided diametrically extending guides at opposite sides of the axis of rotation such guides being arranged in pairs, four in number where there are eight guides. The guide blocks and the track blocks are of equal weights and similar and are disposed in such aligned guides in such relation as to assure static and dynamic balance at all times. Thus, for instance, referring to Figure 3 it will be apparent that the aligned guides have associated blocks which are disposed at diametrically opposite sides of the shaft $d$. Such opposed track blocks are engaged through their flange $l^2$ with different tracks rather than with the same track. Since the tracks are laid out of equal diameter and about centers which are equidistant from the axis of rotation and at diametrically opposite points it necessarily follows that the movements of such opposed blocks is equal and in the same direction along a diameter of the tracks. In other words, the opposed blocks at all times move in the same direction linearly, that is to say, when one of the blocks is moving outwardly with reference to the shaft its opposed block is moving inwardly and vice versa.

Figure 6:
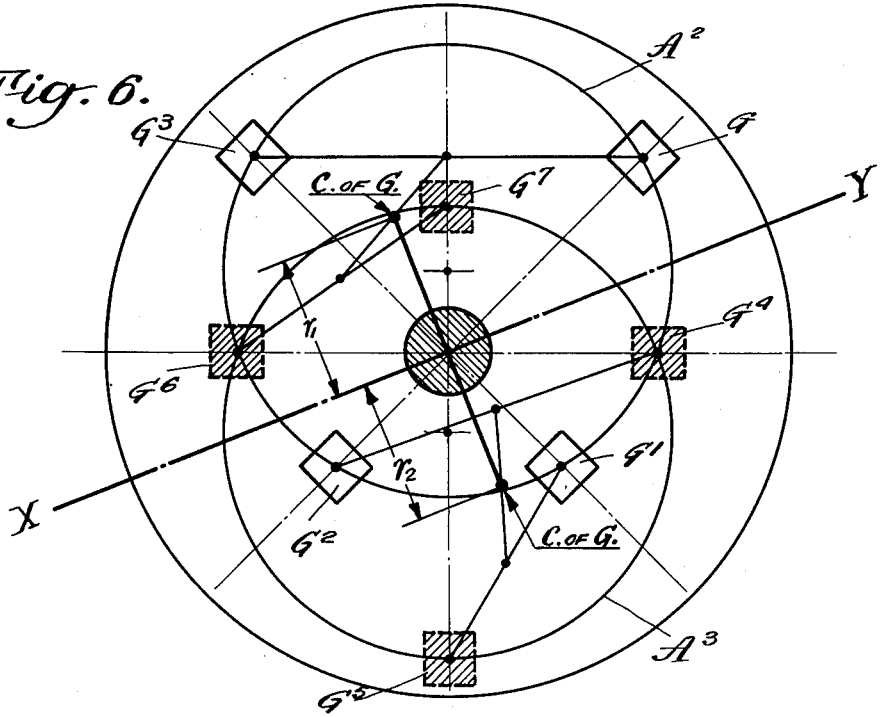
Figure 6 is a diagram showing the relation of the blocks by which static balance is assured at all times.

Referring now to Figure 6 one of the tracks is indicated diametrically at $A^2$ while the other track is referred to at $A^3$. Four of the impellers are represented by unshaded squares G, G', G², G³, each of these impellers being operatively engaged with the track $A^2$. Four of the other impellers are represented by shaded squares at G⁴, G⁵, G⁶, G⁷, and are engaged operatively with the other track $A^3$. The respective sets of blocks are disposed in pairs and are diametrically opposed at opposite sides of the axis of rotation. In Figure 6 the center of gravity of the four impellers G, G³, G⁶, G⁷, is indicated by the arrow and the center of gravity of the remaining four blocks is likewise indicated by an arrow. These centers of gravity are at diametrically opposite sides of the axis of rotation and equidistant therefrom assuring static balance. For the purposes of the diagram the centers of gravity are located with reference to the diameter X, Y, passing through the axis of rotation but it will be apparent that as the blocks move in their respective tracks and the respective centers of gravity are translated the same static balance will always be preserved with reference to a diameter. In other words, $r'$ and $r^2$ will always be equal and it is assumed that the masses of the respective sets of blocks are equal.

Figure 7:
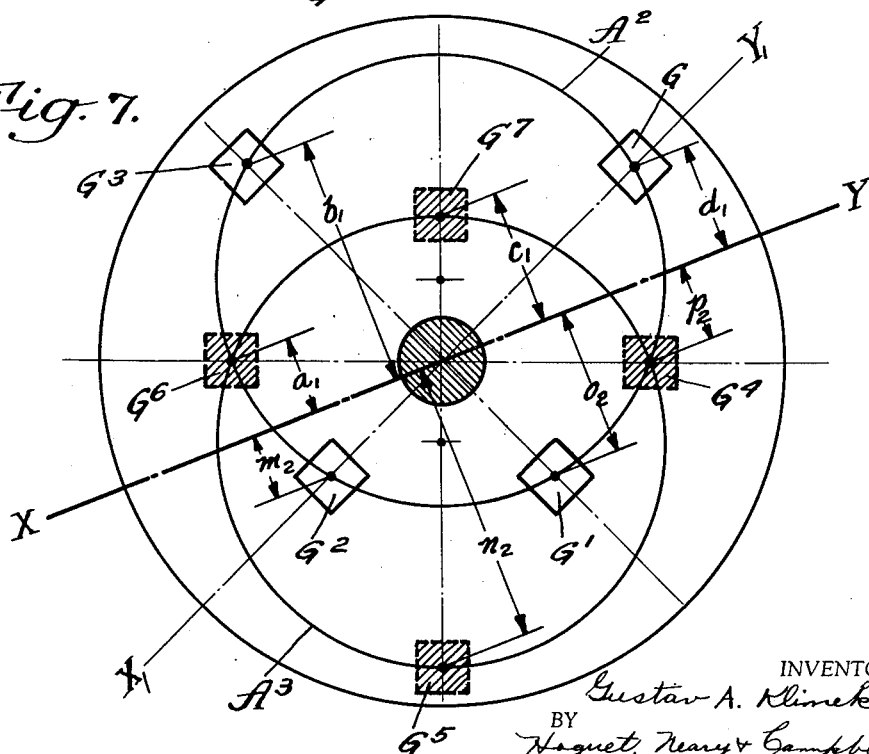
Figure 7 is a diagram showing the relation of the blocks by which dynamic balance is assured at all times.

Figure 7 is a diagram showing vectorially the moments of each impeller during operation. These moments are indicated with reference to a diameter X, Y.

In Figure 8 there is illustrated graphically the sum of the several moments of the respective impellers of each group and from this diagram it is apparent that the sum of the moments of the two sets is equal even though the moments of particular blocks at any instant be unequal. The diagram shows the moments a', b', c', d' of the blocks G⁶, G³, G⁷ and G, at one side of the diameter X, Y, while the lines m², n², o² and p², show the moments of the blocks G², G⁵, G' and G⁴ of the blocks at the other side of the diameter.

The operation of one of the impellers g is shown diagrammatically in Figures 9–14. The block g is constrained to move radially between the guides e, f, by reason of its engagement with the track a³ upon rotation of the primary rotor comprising the end walls a', b, of the casing. Radial movement of the impeller under the influence of the primary rotor impresses rotative motion on the secondary rotor which carries the guides e, f. The operating side of the track by which the rotative force is impressed by the primary rotor is indicated by the heavy shaded lines and it will be apparent from Figure 14 that reversal of the direction of movement of the block g is accomplished by a reversal in the stress surface of the track from one side to the other. Stated another way, the outside of the track of the primary rotor may be thought of as pulling the block inwardly towards the axis of rotation while the inner face of the track serves to push the block outwardly away from the axis of rotation. The reactance is established by the frictional engagement of the blocks with the guides, the pressure of the bearing surfaces of the blocks on the guides increasing under the influence of the springs h at the outer ends of the guides which are closer together and thus constricted. However, the principle of operation set forth in said copending application is retained in a broad sense.

Figure 15 indicates that impeller impulses are provided for every 45° during the rotation of the primary rotor so that the power is delivered smoothly at all times. This results from the increase in the number of impellers as well as the engagement of the opposed impellers with the same track rather than with different tracks.

It will be appreciated that the centrifugal force impressed on the blocks, respectively, varies with their distance from the axis of rotation. Accordingly, it is desirable that the reactance created by the provision of the reversely tapered guides and the spring should be, insofar as practically possible, in general proportion to the centrifugal force. Accordingly, the characteristics of the springs and the angle of the taper are so interrelated as to insure a reactance curve which is generally similar to the curve of centrigual force during the travel of each particular block.

The novel characteristics of the improved construction are defined by the attached claims.

What I claim is:

1. A torque converter comprising in combination a driving rotor, a driven rotor, radial guides carried by the driven rotor, circular tracks carried by the driving rotor, impellers disposed within said radial guides and operatively engaged with said tracks, and mechanical reactance means embodied in said impellers to reduce forces opposing the rotation of the driven rotor in a predetermined direction.

2. A torque converter comprising in combination a driving rotor, a driven rotor, similar movable impellers disposed in pairs at diametrically opposite sides of the axis of said rotors, circular tracks carried by the driving rotor and disposed eccentrically with respect to one another and with respect to the axis of said driven rotor, and means engaging the impellers of each pair with the same track, respectively, whereby the impellers of a pair are constrained to move in the same direction at all times.

3. A torque converter comprising in combination a driving rotor, a driven rotor, similar movable impellers disposed in pairs at diametrically opposite sides of the axis of said rotors, circular tracks carried by the driven rotor and disposed eccentrically with respect to one another and with respect to the axis of said driven rotor, means engaging the impellers of each pair with the same tracks, respectively, whereby the impellers are constrained to move, and means carried by the driving rotor and engaging said impellers, respectively, to cause said impellers to move radially upon rotation of the driving rotor and during the planetary movement of said impellers under the constraint of said tracks.

4. A torque converter comprising in combination a driving rotor, a driven rotor, similar movable impellers disposed in pairs at diametrically opposite sides of the axis of said rotors, circular tracks carried by the driven rotor and disposed eccentrically with respect to one another and with respect to the axis of said driven rotor, means engaging the impellers of each pair with the tracks, respectively, whereby the impellers are constrained to move, means carried by the driving rotor and engaging said impellers, respectively, to cause said impellers to move radially upon rotation of the driving rotor and during the planetary movement of said impellers under the constraint of said tracks, said tracks being formed about centers which are diametrically opposed at equal distances from the axis of said driven rotor, and frictional means operatively engaged with said impellers to oppose their radial movements and thereby reduce the force tending to oppose rotation of the said driven rotor in a predetermined direction.

5. A torque converter comprising in combination a driving rotor, a driven rotor, similar movable impellers disposed in at least four pairs at diametrically opposite sides of the axis of said rotors, circular tracks carried by the driving rotor and disposed eccentrically with respect to one another and with respect to the axis of said driven rotor, means engaging the impellers of each pair with the same track, respectively, whereby impellers are constrained to move, means carried by the driven rotor and engaging said impellers, respectively, to cause said impellers to move radially upon rotation of the driving rotor and during the planetary movement of said impellers under the constraint of said tracks, and spring means embodied in said impellers to create reactance during movements in predetermined directions to reduce forces impressed thereon and on the driven rotor tending to oppose rotation thereof in a predetermined direction.

6. A torque converter comprising in combination an enclosed circular casing constituting a driving rotor, radially extending guides within the casing, and carried by a driven rotor, impellers mounted slidably in said radial guides, respectively, and having frictional engagement therewith, circular tracks on the driving rotor engaged operatively with said impellers, and means carried with the impellers to create predetermined frictional resistance to their radial movements in predetermined directions.

GUSTAV A. KLIMEK.